US010929159B2

(12) United States Patent
Pallapolu et al.

(10) Patent No.: US 10,929,159 B2
(45) Date of Patent: Feb. 23, 2021

(54) AUTOMATION TOOL

(71) Applicant: Bank of America Corporation, Charlotte, NC (US)

(72) Inventors: Kalyan Chakravarthy Pallapolu, Hyderabad (IN); Sriram Balasubramanian, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 201 days.

(21) Appl. No.: 16/259,156

(22) Filed: Jan. 28, 2019

(65) Prior Publication Data
US 2020/0241900 A1 Jul. 30, 2020

(51) Int. Cl.
| *G06F 9/455* | (2018.01) |
| *G06F 9/451* | (2018.01) |
| *G06F 11/34* | (2006.01) |
| *G06N 3/02* | (2006.01) |
| *G06K 9/00* | (2006.01) |
| *G06K 9/62* | (2006.01) |

(52) U.S. Cl.
CPC .......... *G06F 9/45512* (2013.01); *G06F 9/451* (2018.02); *G06F 11/3414* (2013.01); *G06F 11/3438* (2013.01); *G06K 9/00711* (2013.01); *G06K 9/6215* (2013.01); *G06N 3/02* (2013.01)

(58) Field of Classification Search
CPC .. G06F 9/45512; G06F 9/451; G06F 11/3414; G06F 11/3438; G06F 8/35; G06N 3/02; G06K 9/00711; G06K 9/6215
See application file for complete search history.

(56) References Cited

U.S. PATENT DOCUMENTS

| 7,039,899 | B1 | 5/2006 | Quiroga |
| 9,317,406 | B2 | 4/2016 | Pilot et al. |
| 9,348,727 | B1 | 5/2016 | Cai et al. |
| 9,754,351 | B2 | 9/2017 | Paluri et al. |
| 10,019,346 | B2 | 7/2018 | Luan et al. |
| 10,025,695 | B2 | 7/2018 | Cai et al. |
| 2015/0363300 | A1* | 12/2015 | Luan ................. G06F 11/3684 714/38.1 |

* cited by examiner

*Primary Examiner* — Andrey Belousov
(74) *Attorney, Agent, or Firm* — Michael A. Springs

(57) ABSTRACT

A memory stores an environment file. A hardware processor receives a video file comprising a first frame and a second frame. The hardware processor determines a first object in the first frame and a first user action performed in the first frame. The hardware processor determines a second object in the second frame and a second user action performed in the second frame. The hardware processor determines a first keyword for the first user action and a second keyword for the second user action. The hardware processor determines, based on the first and second keywords, a first script and a second script from the environment file. The hardware processor then combines the first script and the second script to generate an automation script that, when executed, performs the first user action on the first object and the second user action on the second object.

18 Claims, 4 Drawing Sheets

AUTOMATION TOOL

TECHNICAL FIELD

This disclosure relates generally to automation scripting.

BACKGROUND

Computers and mobile devices increasingly use automation scripts to automate tasks. In many instances, these scripts are generated through inefficient and inaccurate processes requiring significant user input.

SUMMARY OF THE DISCLOSURE

Computers and mobile devices increasingly use automation scripts to automate tasks. For example, these devices may use automation scripts to perform logon and logoff, activate and shut down a server, push and pull data, perform security and vulnerability scans according to set schedules, etc. In some instances, these scripts can be used to simulate user activity to test the functionality of the device or system. Additionally, these scripts can be used to simulate user activity by a large user base to see how a device or system will perform under stress. Typically, these scripts are used to perform a set of tasks that may be considered routine according to certain schedules, such as maintenance schedules.

In many instances, automation scripts are generated using inefficient processes which require an individual to meticulously program an automation script for each task being automated. For example, a user, who may or may not be proficient in automation scripting, may desire an automation script for performing a task of interest. The steps of this task must be conveyed to a skilled programmer who will prepare an initial automation script for the task. Many iterations of testing and reprogramming are generally required before the automation script successfully performs the user's task of interest, resulting in significant waste of system resources for each automation script.

This conventional approach to automation scripting has limited the wider adoption of automation scripting. For example, because of the inefficiency of conventional approaches, the number of automation scripts that can be generated is limited, effectively preventing the automation of many tasks. These approaches also do not provide an efficient or accurate means of determining whether an automation script already exists for a given task. Thus, automation scripts are commonly reproduced for tasks that already have an automation script, resulting in further waste of system resources.

This disclosure contemplates an unconventional automation tool that generates an automation script using a video file that includes a video representing a task being performed. For example, the video file may include a visual recording (e.g., a series of screenshots) of a user interface while the task is performed. The tool may analyze each frame of the video file and, based on this analysis, generate an automation script for the task represented in the video file. The automation script can then be executed to perform the task presented in the video file.

The tool may also facilitate efficient generation of new automation scripts based on related automation scripts that were previously generated. This may also allow for improved maintenance of previously generated automation scripts. For example, the tool, in certain embodiments, determines whether an automation script was previously generated for the task performed in the video file and uses this information to efficiently generate and maintain automation scripts. Additionally, the automation tool may allow certain automation scripts to be repurposed when the same, or a similar, task is represented in a video file. As a result, the tool reduces system waste by reducing redundant performance of tasks and limiting the number of redundant automation scripts maintained by the system.

According to an embodiment, an apparatus includes a memory and a hardware processor. The memory stores an environment file. The hardware processor receives a video file comprising a first frame and a second frame. The hardware processor determines a first object in the first frame and a first user action performed in the first frame. The hardware processor determines a second object in the second frame and a second user action performed in the second frame. The hardware processor determines, based on the first object and the first user action, a first keyword for the first user action. The hardware processor determines, based on the second object and the second user action, a second keyword for the second user action. The hardware processor determines, based on the first keyword, a first script from the environment file. The hardware processor determines, based on the second keyword, a second script from the environment file. The hardware processor combines the first script and the second script to generate an automation script that, when executed, performs the first user action on the first object and the second user action on the second object.

According to another embodiment, a method includes receiving, by a processor, a video file comprising a first frame and a second frame. The method also includes determining, by the processor, a first object in the first frame and a first user action performed in the first frame. The method includes determining, by the processor, a second object in the second frame and a second user action performed in the second frame. The method includes determining, by the processor, based on the first object and the first user action, a first keyword for the first user action. The method includes determining, by the processor, based on the second object and the second user action, a second keyword for the second user action. The method includes determining, by the processor, based on the first keyword, a first script from an environment file. The method includes determining, by the processor, based on the second keyword, a second script from the environment file. The method also includes combining, by the processor, the first script and the second script, to generate an automation script that, when executed, performs the first user action on the first object and the second user action on the second object.

According to yet another embodiment, a system includes a database and an automation tool. The database includes an environment file. The automation tool receives a video file comprising a first frame and a second frame. The automation tool determines a first object in the first frame and a first user action performed in the first frame. The automation tool determines a second object in the second frame and a second user action performed in the second frame. The automation tool determines, based on the first object and the first user action, a first keyword for the first user action. The automation tool determines, based on the second object and the second user action, a second keyword for the second user action. The automation tool determines, based on the first keyword, a first script from the environment file of the database. The automation tool determines, based on the second keyword, a second script from the environment file of the database. The automation tool combines the first script and the second script to generate an automation script that, when executed, performs the first user action on the first object and the second user action on the second object.

Certain embodiments provide one or more technical advantages. For example, an embodiment reduces system resource waste by reducing the number of redundant task executions. As another example, an embodiment allows certain automation scripts to be used even though the scripts contain undesired tasks. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
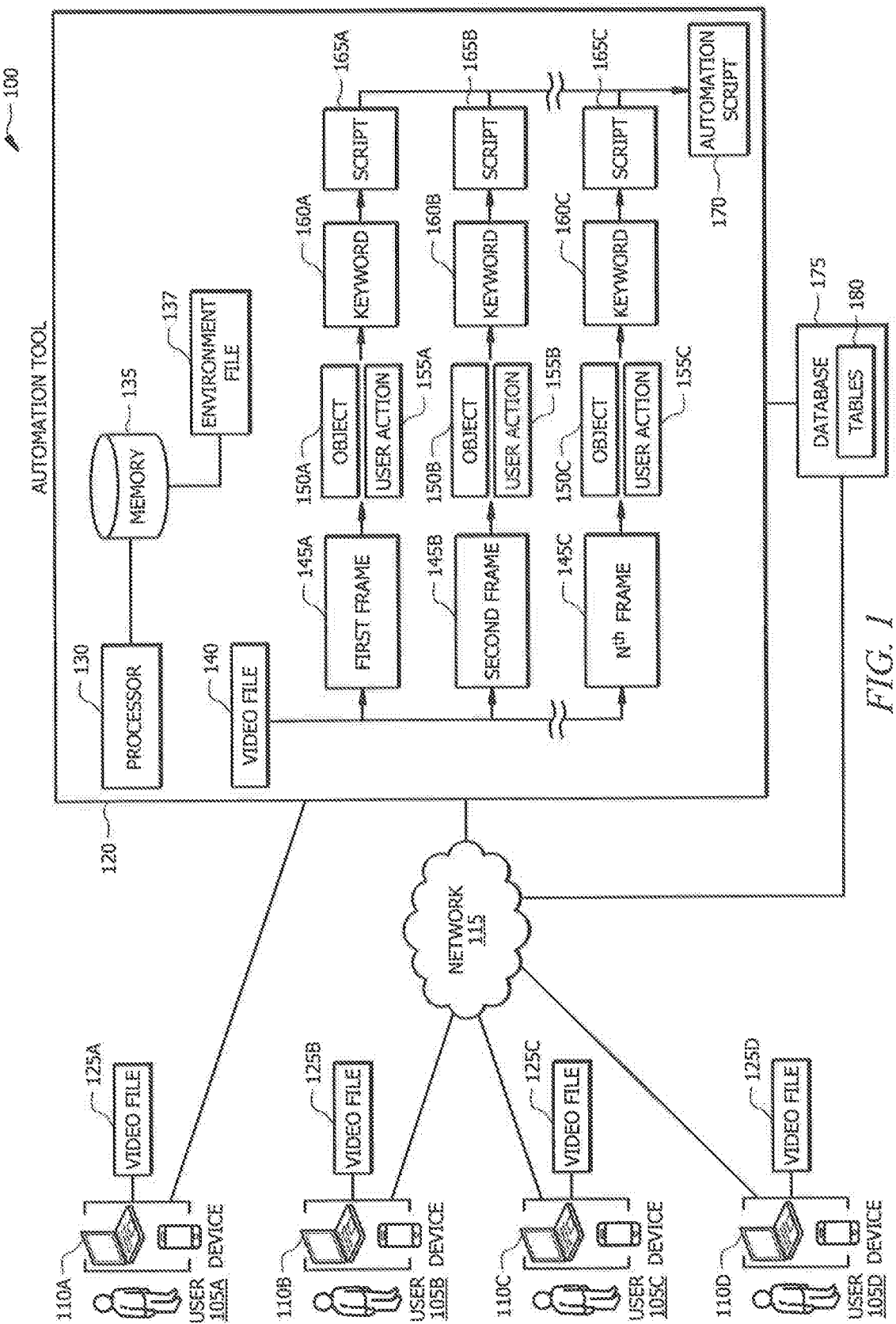
FIG. 1 illustrates an example system.

Embodiments of the present disclosure and its advantages are best understood by referring to FIGS. 1 through 4 of the drawings, like numerals being used for like and corresponding parts of the various drawings.

Computers and mobile devices increasingly use automation scripts to automate tasks. However, in many instances, automation scripts are generated using inefficient processes which require an individual to meticulously program an automation script for each task being automated. For example, a user, who may or may not be proficient in automation scripting, may desire an automation script for performing a task of interest. The steps of this task must be conveyed to a skilled programmer who will prepare an initial automation script for the task. Many iterations of testing and reprogramming are generally required before the automation script successfully performs the user's task of interest, resulting in significant waste of system resources to generate each automation script.

Conventional approaches to automation scripting have limited the wider adoption of this field of technology. For example, because of the inefficiency of conventional approaches, the number of automation scripts that can be generated is limited, effectively preventing the automation of many tasks. These approaches also do not provide an efficient or accurate means of determining whether an automation script already exists for a given task. Thus, automation scripts are often unnecessarily reproduced for tasks that already have an automation script, resulting in further waste of system resources.

This disclosure contemplates an unconventional automation tool that generates an automation script using a video file that includes a video representing a task being performed. For example, the video file may include a visual recording (e.g., a series of screenshots) of a user interface while the task is performed. The tool receives a video file and, through a series of unique processes, transforms the video file into an automation script which when executed performs a task or tasks represented in the video file. Upon execution, the automation script can perform these task(s). Example tasks performed via an automation script may include, for example, performing logon and logoff actions, activating and shutting down a server or servers, pushing and pulling data, performing security and vulnerability scans according to set schedules, and the like. Automation scripts may also be used to simulate user activity to test device or system functionality. For example, automation scripts can be used to simulate user activity by a large user base to see how a device or system will perform under stress. The ability to efficiently generate automation scripts from video files, as contemplating in the present disclosure, allows these and similar functions to be performed with decreased waste of system resources.

In certain embodiments, the automation tool may also facilitate efficient generation of new automation scripts based on previous automation scripts for related tasks. This may also allow for improved maintenance of previously generated automation scripts. For example, as described in greater detail below, the tool may determine whether an automation script was previously generated for the task performed in the video file and uses this information to efficiently generate and maintain automation scripts. Additionally, or alternatively, the automation tool may allow certain automation scripts to be repurposed when the same, or a similar, task is represented in a video file. As a result, the tool reduces system waste by reducing redundant performance of tasks and limiting the number of redundant automation scripts maintained by the system.

FIG. 1 illustrates an example system 100, according to certain embodiments of the present disclosure. System 100 includes one or more devices 110A-D, a network 115, an automation tool 120, and a database 175. Each device 110A-D may store one or more video files 125A-D representing a task or tasks being performed. For example, a video file may include a visual recording (e.g., a series of screenshots) of a user interface while the task is performed. The video file may include a series of images of a mouse cursor moving about the user interface of an application and selecting objects to perform actions in the application. The images may show a "click" user action being performed on a save-file button object and/or a "double click" action being performed on an open-object button object. Generally, automation tool 120 may receive one of video files 125A-D or a video saved in a memory as video file 140 from a corresponding user device 110A-D. Automation tool then transforms video file 140 into an automation script 170. Video file 140 may be the same as received video file 125A-D or may be pre-processed to further facilitate generation of automation script 170 by automation tool 120, as described in greater detail herein.

Automation tool 120 includes a processor 130 and a memory 135. Memory 135 stores an environment file 137. Environmental file 137 is used at least in part to facilitate the transformation of video file 140 into automation script 170. Processor 130 is any electronic circuitry, including, but not limited to microprocessors, application specific integrated circuits (ASIC), application specific instruction set processor (ASIP), and/or state machines, that communicatively couples to memory 135 and controls the operation of automation tool 120. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of automation tool 120 by processing information received from devices 110A-D, network 115, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Devices 110A-D may be any device capable of generating and storing a video file. For example, any of devices 110A-D may store one or more video files which may be communicated to automation tool 120. Each of devices 110A-D may also initiate the generation of automation scripts by automation tool 120. As another example, devices 110A-D may instruct automation tool 120 to determine a script for each frame of a video file and combine these scripts to generate an automation script. In certain embodiments, devices 110A-D may communicate with automation tool 120 through network 115 via a web interface. In some embodiments, devices 110A-D instruct automation tool 120 by issuing commands to automation tool 120.

Devices 110A-D include any appropriate device for communicating with components of system 100 over network 115. For example, devices 110A-D may be a telephone, a mobile phone, a computer, a laptop, a tablet, an automated assistant, and/or a cash register. This disclosure contemplates each of devices 110A-D being any appropriate device for sending and receiving communications over network 115. As an example and not by way of limitation, any of devices 110A-D may be a computer, a laptop, a wireless or cellular telephone, an electronic notebook, a personal digital assistant, a tablet, or any other device capable of receiving, processing, storing, and/or communicating information with other components of system 100. Each of devices 110A-D may also include a user interface, such as a display, a microphone, keypad, or other appropriate terminal equipment usable by users 105A-D. In some embodiments, an application executed by a device 110A-D may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 175 generally stores information used by automation tool 120. For example, database 175 can store one or more tables 180 used by automation tool 120. This disclosure contemplates database 175 storing information arranged in any format. For example, database 175 may store files, directories, and/or queues. The information stored in database 175 may be used to generate and/or execute various automation scripts. For example, database 175 may store in tables 180 information related to previously received video files and previously generated automation scripts. For example, tables 180 may include information related to known objects and known user actions performed on these objects. In the illustrative example of FIG. 1, tables 180 are stored in database 175. However, such tables may also or alternatively be stored locally in a memory of automation tool 120, such as memory 135. In certain embodiments, database 175 includes an environment file for use by the automation tool. Database 175 may also include training data for a deep convolutional neural network (D-CNN) or other artificial intelligence module used by automation tool 120. This training data may be continuously updated during operation of automation tool 120.

In an example operation of system 100 shown in FIG. 1, video file 140 is received by automation tool 120 and used to create automation script 170, which, when executed, performs tasks represented by video file 140. For example, a video file 125A-D, stored in device 110A-D, may be communicated via network 115 to automation tool 120. The received video file 140 may be communicated via network 115. In certain embodiments, as shown in FIG. 1, device 110A may comprise automation tool 120 such that, for example, the processor 130 and memory 135 of automation tool 120 are a processor and memory of device 110A.

Automation tool 120 generally analyzes a first frame 145A and a second frame 145B of the received video file 140 and generates a script (165A and 165C) for each frame. Additional frames, up to and including each frame of the video file 140, may also be evaluated. For example, the automation tool may evaluate up to an $N^{th}$ frame 145C of video file 140, where the $N^{th}$ frame 145C may be the final or an earlier frame of video file 140. Frames may generally be analyzed sequentially (e.g., in series) or in parallel by automation tool 120.

For the first frame 145A, automation tool 120 determines a first object 150A and first user action 155A performed on object 150A. In certain embodiments, automation tool 120 determines the first object 150A and first user action 155A by applying a deep convolutional neural network (D-CNN) to the first frame 150A. The D-CNN may be configured and trained as described herein. For example, the D-CNN may include tenser flow object detection or an API using single shot detection model. A D-CNN may facilitate the localization of objects in the video file. In general, training data are used to train the D-CNN to identify each known object type and determined when unknown objects are detected. Training data may be a collection of training video files which are linked to objects and user actions performed on those objects. In general, a D-CNN is trained for each known object and user action. Training data may also include information about keywords and/or automation scripts associated with each training video file.

Each frame (145A, 145B, 145C) may be converted to a format appropriate to apply a D-CNN to the frame. For example, a frame is converted to a format referred to herein as a "blob." A blob may, for example, be formatted for improved recognition of objects and user actions in a video file than would be possible in the original video file format. A blob generated for each frame may be used as an input to the D-CNN to provide detection of objects and user actions in the frame from which the blob originated. In some instances, an unknown object may be detected in a frame or blob. In these cases, the unknown object may be compared to known objects (e.g., stored in tables 180 of database 175) and the object may be assigned to a nearest object or frequently determined object (e.g., based on a history or previously determined objects and user actions).

In certain embodiments, an unknown object may be a non-standard or custom object. Such non-standard or custom objects are common in applications where objects may be modified to achieve certain desired features. For example, an object may be a button located in the upper left corner of a user interface for saving a file. In some instances, an object may be modified (e.g., to change its size and/or position) in a user interface. The present disclosure contemplates the identification of such modified objects. For example, the identity of these objects, in certain embodiments, is determined based on information in database 175 and/or environment file 137. This information may include a record of known or frequently occurring modifications to objects. In certain embodiments, automation tool 120 identifies an object in a frame of video file 140 as being of an unknown object type and determines the object based on the nearest object type, using information stored in database 175 and/or memory 135. A type of a given object may be compared to a list of known object types to determine a similarity score between the object and a known object from the list. A similarity score reflects an extent to which features or properties are shared between an unknown object and a known object. If the similarity score is greater than or equal to a predetermined similarity threshold, the known object type is assigned to the object. Otherwise, automation tool may request user input to determine the object type or a new object type may be automatically created.

Using the first object 150A and first user action 155A, a keyword 160A is then determined by automation tool 120. In certain embodiments, keyword 160A is determined using the same, or a similar, D-CNN or artificial intelligence module to that used to determine the first object 150A and first user action 155A. In other words, an output of D-CNN applied to frame 145A may include first object 150A, first user action 155A, and first keyword 160A. In certain embodiments, the first keyword is determined based at least in part on a record of previously determined objects and user actions and keywords associated with these objects and actions. For example, tables 180 of database 175 may include information about previously determined or known pairs of objects and user actions. This information may include, for example, a keyword or keywords associated with these pairs of objects and user actions. For example, the information may be a ranked list of keywords that are likely to be associated with a given object-user action pair. Examples of objects, actions, and keywords are shown in Table 1 below.

TABLE 1

Examples of objects, user actions performed on the objects, and keywords for the objects and user actions.

| Object | User Action | Keyword |
|---|---|---|
| Button | Click | Button click ("BtnClick") |
| Button | Double click | Button double click ("BtndblClick") |
| Check box | Uncheck | Uncheck box ("ChkUn") |
| Combo box | Select more than one box | Select multiple boxes ("CBmultislt") |
| Link | Click | Click a link ("Lnkclick") |
| Text box | Enter alphanumeric string | Enter data in text box ("Txtbox") |

In certain embodiments, automation tool 120 determines a position of a first object from the first frame 145A and determines or updates keyword 160A based on this position information. This may improve the accuracy with which keyword 160A is determined. For example, location coordinates (e.g., x-y coordinates) of an object in a user interface may be determined, and these location coordinates may be used to increase the accuracy of object determination. Objects associated with a menu in a user interface are likely to have location coordinates corresponding to the top of the user interface, and an object with location coordinates corresponding to the top of a user interface would likely be associated with the menu.

After keyword 160A is determined by automation tool 120, the tool 120 uses keyword 160A and environment file 137 to determine a first script 165A for first frame 145A. Environment file 137 is generally stored in memory 135 of automation tool 120, as shown in the illustrative example of FIG. 1. However, in certain embodiments, an environment file is stored in a database, such as database 175 of system 100. Environment file 137 may include a keyword searchable library comprising an application uniform resource locator (URL), script files, classes, and data sheets. Automation tool may use keyword 160A to identify one or more scripts stored in environment file 137 that are associated with this keyword. In certain embodiments, if more than one script is available for a first keyword 160A, the first object 150A and first user action 155A are used by the automation tool 120 to further refine the determination of script 165A. In certain embodiments, if more than one script is determined for keyword 160A, a ranking of scripts stored in database 175 is used to determine first script 165A based on keyword 160A. For example, a script for keyword 160A with the highest frequency of use may be selected as first script 165A.

The functions described above for determining first script 165A for first frame 145A are repeated, or performed in parallel, to determine a second script 165B for second frame 145B, and optionally additional script(s) 165C for one or more additional frames 145C. For example, automation tool 120 determines, for second frame 145B, a second object 150B, a second user action 155B, a and a second keyword 160B. The second keyword 160B is used with environment file 137 to determine second script 165B. This process may optionally be repeated for one or more $N^{th}$ frames 145C of video file 140 to determine $N^{th}$ object(s) 150C, $N^{th}$ user action(s) 155C, $N^{th}$ keyword(s) 160C, and $N^{th}$ script(s) 165C. Automation tool 120 combines the first script 165A, second script 165B, and, optionally, the $N^{th}$ script(s) 165C to generate automation script 170, which, when executed, performs user actions 155A, 155B, and (optionally) 155C on the corresponding objects 150A, 150B, and (optionally) 155C.

In certain embodiments, combining scripts 165A, 165B, and (optionally) 165C may include a linear combination of these scripts. For example, the automation script may be a linear combination of first script 165A, second script 165B, and any optional script(s) 165C. In other words, scripts (165A-C) may be layered one after the other to generate the automation script. However, in other embodiments, combining scripts 165A, 165B, and (optionally) 165C includes modification of one or more of the scripts. For example, unnecessarily repeated scripts may be removed, or scripts may be extended or concatenated as required to generate an executable automation script. This modification may involve, for example, comparison of the resulting automation script 170 to previously determined automation scripts or known automation scripts stored in database 175 and/or memory 135.

After automation script 170 is generated by automation tool 120, automation script 170 may be executed by automation tool 170 or stored by the automation tool for execution at a later time or on another device. Automation script 170 can be used, for example, to make processes more efficient for users by eliminating the need for automation scripts to be programmed manually for each combination of tasks. In other instances, automation script 170 can be used to test an application by allowing tasks to be performed automatically in a test mode, e.g. application under test (AUT) mode, such that the application can be efficiently tested without significant user input. By generating automation script 170 using automation tool 120, based primarily on a received video file and information stored in environment file 130, this entire process of task automation or application testing can be performed efficiently with little user input and greatly reduced use of system resources.

In certain embodiments, automation tool 120 further facilitates efficient updating and maintenance of environment file 137 and/or tables 180 based on historical information from previously generated or known automation scripts. Examples of maintaining and updating an environment file 137 and information in tables 180 are described in greater detail below, for example, with respect to FIG. 4. In brief, if received video file 140 was recorded after a previously received video file that is associated with the same, or a similar, task (i.e., if video file 140 is a relatively "new" video), automation script 170 may be used to update the previous automation script for the relatively "old" video file. Otherwise, if video file 140 is relatively "old" compared to a previously received video file, automation script 170 may be determined at least in part based on the automation script for the previously received video file. Previously determined automation scripts and corresponding objects, user actions, keywords, and video files are generally stored in database 175 and/or in memory 135.

Figure 2:
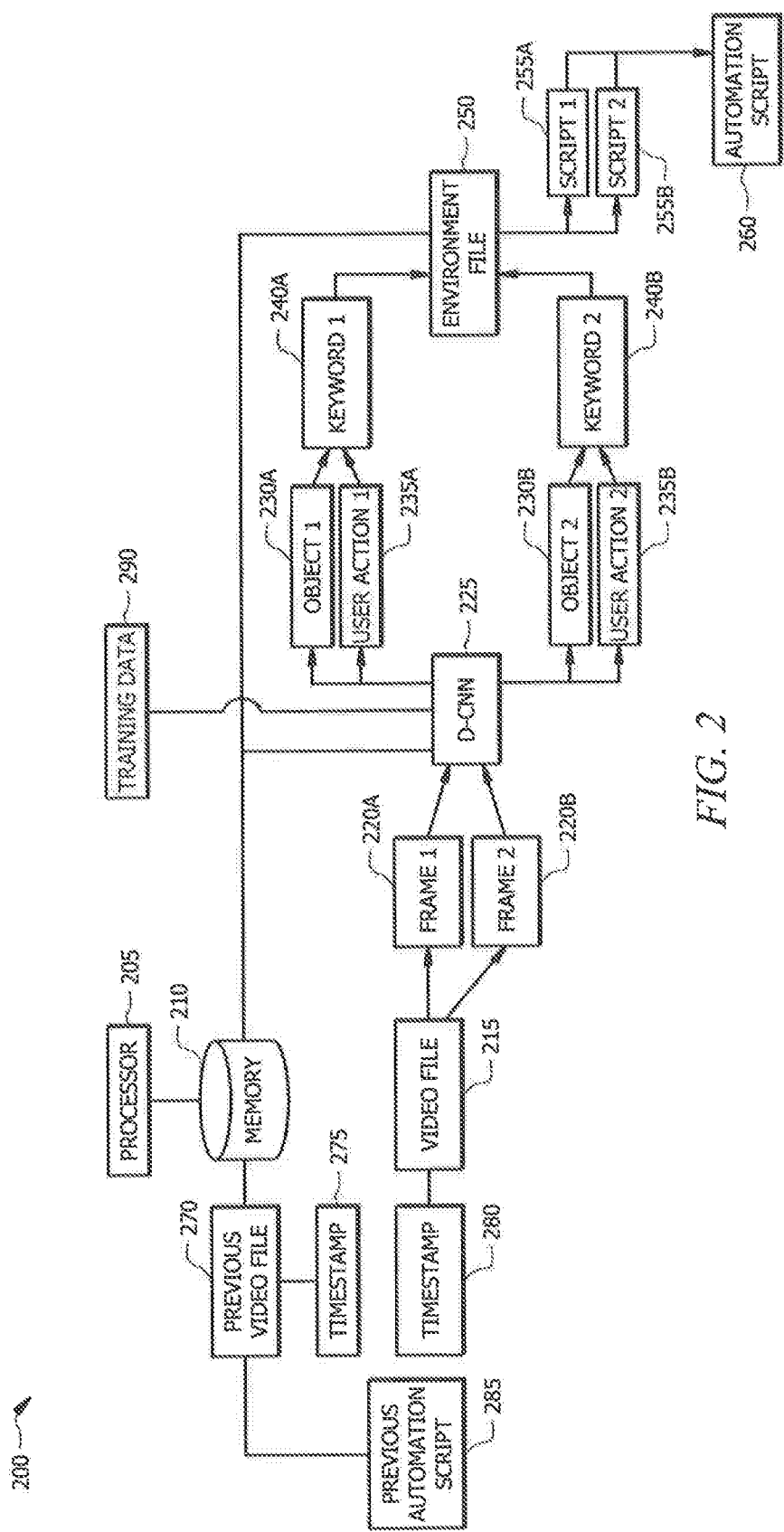
FIG. 2 illustrates an example automation tool of the system of FIG. 1.

FIG. 2 shows an example automation tool 200 for use with system 100. Automation tool 200 includes a processor 205 and a memory 210. The memory 210 stores an environment file 250 and a deep convolutional neural network (D-CN) 225. In general, processor 205 is configured to receive a video file 215 and generate an automation script 260 for a task presented in the video file 215 using the D-CNN 225 and information stored in environment file 250. Processor 205 is any electronic circuitry, including, but not limited to microprocessors, application specific integrated circuits (ASIC), application specific instruction set processor (ASIP), and/or state machines, that communicatively couples to memory 210 and controls the operation of automation tool 200, as described above with respect to processor 130 of system 100 of FIG. 1. Processor 205 may be a programmable logic device, a microcontroller, a microprocessor, any suitable processing device, or any suitable combination of the preceding. Processor 205 is not limited to a single processing device and may encompass multiple processing devices.

Memory 210 may store, either permanently or temporarily, data, operational software, or other information for processor 205 including D-CNN 225 and environment file 250. Memory 210 may include any one or a combination of volatile or non-volatile local or remote devices suitable for storing information. For example, memory 210 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 210, a disk, a CD, or a flash drive. In particular embodiments, the software may include an application executable by processor 205 to perform one or more of the functions described herein.

D-CNN 225 is generally trained using training data 290 stored in memory 210 or in a separate memory or database, such as database 175 of FIG. 1. Training data 290 may include for example images of a user interface comprising a known object and a known user action. In certain embodiments, the D-CNN 225 is updated based on automation script 260 determined for video file 215. These updates may facilitate continuous learning by the D-CNN of objects and user actions for improved performance of automation tool 200. These updates may allow frequently detected objects and user actions to be prioritized by the D-CNN 225.

In an example operation of automation tool 200, a video file 215 is received by processor 205. The received video file 215 includes a first frame 220A and a second frame 220B. The automation tool 200, applies D-CNN 225 to first frame 220A and second frame 220B. As described above, this may be performed sequentially or in parallel. The D-CNN determines a first object 230A and a first user action 235A that is performed upon first object 230A in first frame 220A. As described herein, the first frame may be converted to an alternate form, such as a blob, to facilitate analysis using D-CNN 225.

Automation tool 200 then determines a first keyword 240A based on first object 230A and first user action 235A. In certain embodiments, keyword 240A is determined using D-CNN 225. For example, an output of D-CNN 225 applied to frame 220A may include first object 230A, first user action 235A, and first keyword 240A. In certain embodiments, the first keyword 240A is determined based at least in part on a record of previously determined objects and user actions and keywords associated with these objects and actions. For example, information stored in a database (e.g., database 175 of FIG. 1) or in memory 210 may be accessed by processor 205 to determine keyword 240A based on object 230A and user action 235A. This information may include, for example, keywords for previously determined or known pairs of objects and user actions. For example, this information may include a keyword or keywords associated with particular pairs of objects and user actions. This information may include a ranked list of keywords based on their probability of being associated with a given object-user action pair.

Processor 205 then accesses environment file 250 stored in memory 210 and uses keyword 240A to determine (e.g., via a lookup table stored in environment file 250) a first script 255A for a task performed in first frame 220A. This process is repeated, or performed in parallel, for second frame 220B to determine second object 230B, second user action 235B, second keyword 240B, and second script 255B. Automation tool 200 then combines first script 255A and second script 255B to generate automation script 260. In certain embodiments, combining scripts 255A and 255B may include a linear combination of these scripts. However, in other embodiments, combining scripts 255A and 255B includes modification of one or more of the scripts prior to the combination of the scripts. For example, repeated scripts may be removed, or scripts may be extended or concatenated as required to generate an operable automation script. This modification may involve, for example, comparison of the resulting automation script 260 to previously determined automation scripts or known automation scripts stored in memory 210 or a separate database (e.g., database 175 of FIG. 1). After automation script 260 is generated by automation tool 200, automation script 260 may be executed by automation tool 260 or stored by the automation tool for execution later or by another device.

Automation tool 200 may also use information from previously created automation scripts and previously received video files to generate automation script 260 or to update information stored in memory 210 (e.g., to retrain D-CNN 225 or update lookup table(s) of environment file 250). For example, memory 210 can store a previously received video file 270 along with corresponding timestamp 275 and automation script 285. Automation tool 200 can compare timestamp 275 of the previously received video file 270 with timestamp 280 of video file 215 to determine which video file was recorded first. Timestamps 275, 280 include information about when a video file was generated (e.g., recorded). If previously received video file 270 was recorded before video file 215 (i.e., if video file 215 is "new"), automation script 285 may be updated based on automation script 260. For example, if previous video file 270 is determined to represent the same task or tasks represented by more-recently-generated video file 215, the old automation script 285 may be replaced by newer automation script 260.

Otherwise, if previously received video file 270 was recorded after video file 215 (i.e., if video file 215 is "old"), automation script 285 may be used, in combination with D-CNN 225 and environment file 250, to determine automation script 260. For example, previous automation script 285 may be used as a template for automation script 260. In this case, automation script 260 may be the same as previous automation script 285 or may be similar with one or more variations, the variations based on objects 230A,B, user actions 235A,B and/or keywords 240A,B.

In a further illustrative example of the use of automation tool 200 shown in FIG. 2, the video file 215 is a video of a user interface which was recorded while a data set is accessed in an application, an analysis is performed on the data set, and the results of this analysis are stored. The video file 215 includes a series of images (i.e., frames) showing a cursor moving about the user interface of the application to perform these tasks.

The images first show the cursor being moved above an open-file object near the top portion of a user interface of an application and a single-click action being performed on this open-file object. In subsequent images of the video file 215, a window appears that presents a series of files which may be opened by the application, and the cursor moves to select an object for a file of interest by performing a double-click action on the object. D-CNN 225 of automation tool 200 analyzes one or more of these images to determine the open-file object and the single-click user action performed on this object. D-CNN 225 can analyze each image (i.e., frame) separately or two or more images in combination or series to determine the object and user action. Analysis of two or more images in series or combination may allow objects and user actions to be determined more accurately because subsequent images show result(s) of action(s) performed in previous images. For example, if subsequent images show the presentation of a data table, the action can be determined with greater certainty as a single-click action which was performed on an open-file object. An open-file keyword is then determined by automation tool 200 for the combination of the open-file object and single-click user action. Automation tool 200 then accesses environment file 250 and determines, using this keyword, a first script for automating the opening of the file.

Automation tool 200 continues analyzing images of video file 215. The subsequent images show a table being presented which comprises information stored in the file of interest. In next images, the cursor is moved above an analyze-data object and a single-click action is performed on this object. Graphical results of the analysis are then presented in the next images of the video file 215. Automation tool 200 uses D-CNN 225 to determine the analyze-data object and the single-click action from one or more of these images. Automation tool 200 then determines an analyze-data-table keyword for this combination of object and user action. Automation tool 200 then accesses environment file 250 and determines, using this keyword, a second script for automating the analysis of data presented in a table.

Automation tool 200 continues analyzing subsequent images in the video file 215. These images show the cursor moving above a save-results object and a single-click action being performed on this object. In the images, the save-results object is positioned below the graphical results rather than in a standard position in a menu near the top portion of the user interface. From one or more of the images, D-CNN 225 of automation tool 200 initially determines that the save-results object is unknown because of its non-standard position. To identify the unknown object, automation tool 200 accesses a database comprising a list of known or previously determined objects and determines that the unknown object is substantially the same as a known save-results object. Automation tool 200 then determines a save-results keyword for the save-file object and the single-click user action. Automation tool 200 accesses environment file 250 to determine, using this keyword, a third script for automating the task of saving results of the analysis shown in the images.

Automation tool 200 then concatenates the first, second, and third scripts to generate an automation script 260 to perform the series of tasks shown in the video file 215. After the automation script 260 is generated, automation tool 200 compares the automation script to a database of known and previously determined automation scripts. In this illustrative example, a previously generated automation script 285 is identified that automates similar tasks to those automated of the presently generated automation script 260. Automation tool 200 then determines that the present video file 215 was recorded more recently than the video file 270 of the previously generated automation file, based on timestamp 280 of the present video file 215 and time stamp 275 of previous video file 270. In response to this determination, automation tool 200 updates a portion of the previously generated automation script 285 to make it the same as the presently generated automation script 260. This allows, for example, the previously generated automation script 285 to function in the application which may have been modified or updated since previous video file 270 was recorded.

Figure 3:
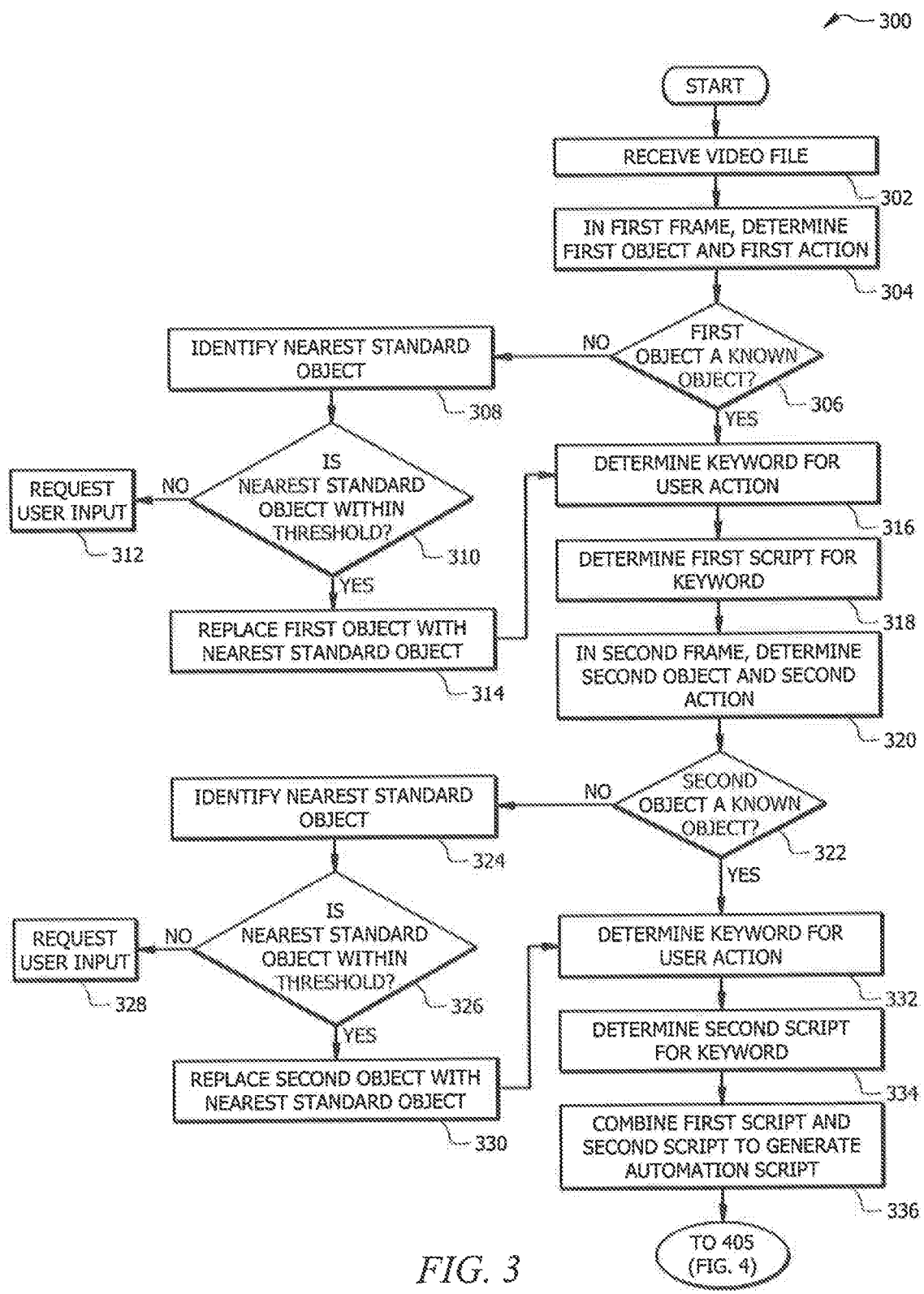
FIGS. 3 and 4 are flowcharts illustrating methods for generating automation scripts using the system of FIG. 1.

FIG. 3 shows an example, method 300 for generating an automation script from a video file using an automation tool, such as automation tools 120 and 200 of FIGS. 1 and 2, respectively. In step 302, a video file is received by a processor of the automation tool. The video file may be received from a user device or loaded from memory. In step 304, the first frame of the video file is analyzed to determine a first object and first user action. For example, a D-CNN or other artificial intelligence module may be applied to the first frame to determine the first object and first user action performed on the object, as described in greater detail herein.

In step 306, a processor determines whether the first object is a known object. In certain embodiments, the D-CNN determines an object along with a corresponding certainty score. The certainty score represents the probability that the determined object is of the correct type. If this probability is greater than or equal to a predetermined threshold (e.g., 80%, 90%, 95%, 99% or up to 100%), the first object is a known object, and the processor proceeds to step 316. If this probability is less than the predetermined threshold, the processor proceeds to step 308.

In step 308, the processor determines a nearest standard object from a list of known standard objects stored in a memory or a database. The similarity score is determined between the object and a nearest (e.g., most similar) object from a list of known objects. The similarity score may represent, for example, a probability that the object and the nearest standard object are the of the same object type.

In step 310, the processor determines if the similarity score is greater than or equal to a predefined similarity threshold. If the similarity score is not greater than or equal to the predefined similarity threshold, method 300 proceeds to step 312 to request user input to facilitate identification of the object detected in the first frame. A user may input a type of the object detected in the first frame. For example, a user may select a type of the object from a list of common object types. In certain embodiments, a new object type may be generated for the object. For example, the new object type may correspond to the type identified via user input. This information may be used to update the D-CNN of the automation tool, and the processor proceeds to step 316 using this new object. Referring still to step 310, if the similarity score is greater than or equal to the predefined similarity threshold, method 300 proceeds to step 314 to replace the first object with the nearest standard object from the list of known objects. This nearest standard object is then used in step 316.

In step 316, the first object and first user action determined for the first frame are used by the processor to determine a keyword for the first user action. For example, a first keyword may be determined based on the first object and first user action using a D-CNN or based at least in part on a record of previously determined objects, user actions, and keywords. The tables stored in a memory or database of an automation tool may include information about previously determined keyword(s) for pairs of objects and user actions.

In step 318, the processor uses the first keyword from step 316 to determine a first script for the first frame using information stored in an environment file. Environment file 137 may include a keyword searchable library comprising an application uniform resource locator (URL), script files, classes, and data sheets. The processor may use the first keyword from step 316 to identify one or more scripts stored in an environment file that are associated with this keyword. If more than one script is available for the first keyword, the first object and first user action may be used by the automation tool 120 or 200 to further refine the determination of a script in step 318. Alternatively, if more than one script is determined for the first keyword, scripts stored in a memory or database of the automation tool may be ranked (e.g., according to frequency of use) and used to determine the first script.

Beginning at step 320, method 300 includes analogous steps to steps 304-318 for determining a second script for the second frame of the received video file. While the determination of a first script for the first frame and a second script for the second frame are performed in series according to method 300 of FIG. 3, it should be understood that, in other embodiments, these steps may be performed in parallel. In brief, a second object and a second user action performed on that object are determined in step 320. In step 322, the processor determines if the second object is a known object. If the second object is known, the processor proceeds to step 332. Otherwise, if the second object is not a known object, the processor proceeds to step 324 in which a nearest standard object is determined for the unknown object. If a similarity score calculated between the second object and the nearest standard object is less than a predetermined similarity threshold, the processor may request user input for the input of a new type for the second object. If the similarity score is greater than or equal to the predetermined similarity threshold, the processor may replace the second object with the nearest standard object. In step 332, the new object from step 328, the nearest standard object from step 332, or the second object from step 320 are used to determine a second keyword for the second frame. In step 334, the processor accesses an environment file and uses the second keyword, using the environment file, to determine a second script for the second frame.

In step 336, the first script and the second script are combined to generate an automation script. Combining scripts may include a linear combination of these scripts or one or more of the scripts may be modified prior to their combination. For example, repeated scripts may be removed, or scripts may be extended or concatenated as required to generate an executable automation script. In general, the automation script generated in method 300 may be executed by an automation tool or stored for execution later or by another device. In certain embodiments, method 300 ends after the automation script is generated.

Modifications, additions, or omissions may be made to method 300 depicted in FIG. 3. Method 300 may include more, fewer, or other steps. For example, steps may be performed in parallel or in any suitable order. While discussed as automation tool (or components thereof) performing the steps, any suitable component of the system, such as device(s) 110A-D of FIG. 1 for example, may perform one or more steps of the methods.

Figure 4:
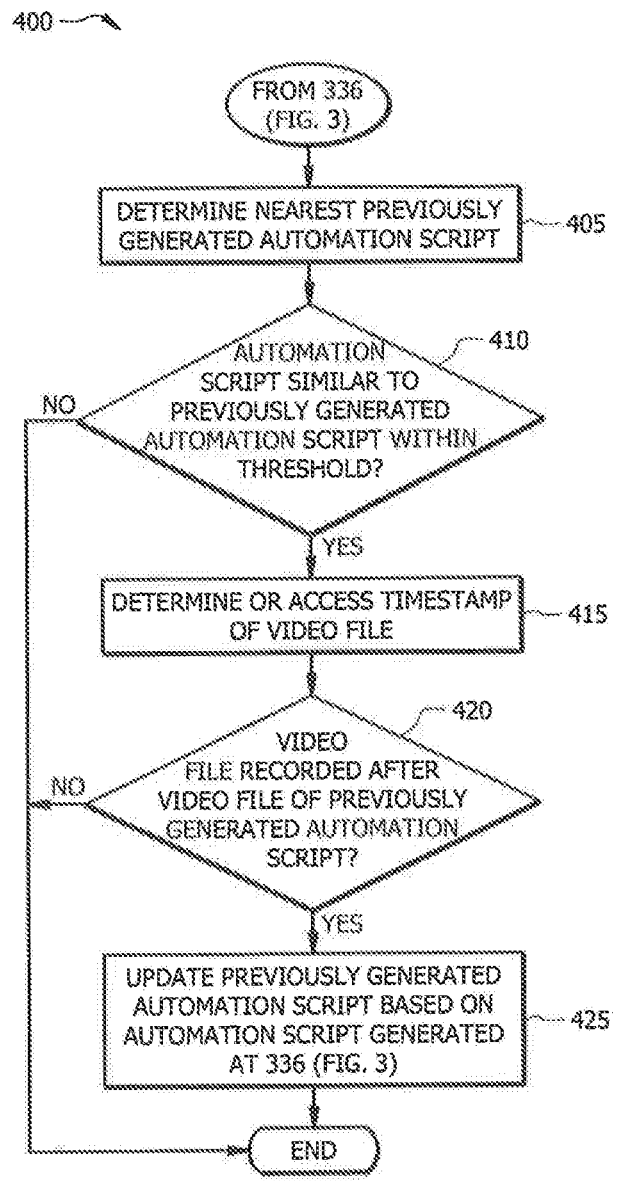

In other embodiments, method 300 proceeds to step 405 of method 400 shown in FIG. 4 to maintain or update the automation tool. In step 405, a nearest previously generated automation script is determined. The processor may compare the automation script created in step 336 of method 300 shown in FIG. 3 to a list of previously generated or otherwise known automation scripts. A similarity score may be calculated between the automation script and the nearest previous automation script. In step 410, the processor determines if the similarity score between the automation script from step 336 and a previously generated (or known) automation script is greater than or equal to a similarity threshold. If this threshold is not met, method 400 may end.

If the threshold of step 410 is met, method 400 proceeds to step 415 where the processor accesses a timestamp of the video file received in step 302 and a timestamp of the video file associated with the previously generated (or known) automation script. In step 420, the processor uses these timestamps to determine if the video file received in step 302 of method 300 was recorded after (i.e., is "newer" than) a video file associated with the previously generated (or known) automation script. If the video file was not recorded after (i.e., if it is "older" than) the video file of the previously generated (or known) automation script, method 400 may end. Otherwise, if the video file was recorded after (i.e., if it is "newer" than) the video file of the previously generated (or known) automation script, method 400 proceeds to step 425, and the previously generated (or known) automation script is updated based on the new automation script created in step 336 of method 300 shown in FIG. 3. For example, the previously generated automation script may be replaced with the automation script of step 336 of method 300. Following this update of the previously generated (or known) automation script, process 400 ends.

Modifications, additions, or omissions may be made to method 400 depicted in FIG. 4. Method 400 may include more, fewer, or other steps. For example, steps may be performed in parallel or in any suitable order. While discussed as automation tool (or components thereof) performing the steps, any suitable component of the system, such as device(s) 110A-D of FIG. 1 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store an environment file;
a hardware processor communicatively coupled to the memory, the hardware processor configured to:
receive a video file comprising a first frame and a second frame;
determine a first object in the first frame and a first user action performed in the first frame;
determine a second object in the second frame and a second user action performed in the second frame;
determine, based on the first object and the first user action, a first keyword for the first user action;
determine, based on the second object and the second user action, a second keyword for the second user action;
determine, based on the first keyword, a first script from the environment file;
determine, based on the second keyword, a second script from the environment file;
combine the first script and the second script to generate an automation script that, when executed, performs the first user action on the first object and the second user action on the second object;
determine a third object in a third frame of the video file;
compare a type of the third object to a list of known object types stored in the memory to determine a similarity score between the third object and a known object from the list;
in response to determining a similarity score that is greater than or equal to a predefined similarity threshold, assign the known object type to the third object; and
in response to determining a similarity score that is less than the predefined similarity threshold, generate a new object type for the third object.

2. The apparatus of claim 1, wherein the processor is further configured to:
determine a position of the first object; and
update, based on the position of the first object, the first keyword for the first user action.

3. The apparatus of claim 1, wherein the processor determines the first object and the first user action by applying a deep convolutional neural network to the first frame.

4. The apparatus of claim 1, wherein the environment file comprises a keyword-searchable library comprising one or more members selected from the group consisting of an application Uniform Resource Locator, script files, classes, and datasheets.

5. The apparatus of claim 1, wherein the processor is further configured to determine the first keyword and the second keyword based at least in part on a record of previously determined objects and user actions.

6. The apparatus of claim 1, wherein the processor is further configured to update the environment file based on the automation script.

7. The apparatus of claim 1, wherein the processor is further configured to:
determine or access a first timestamp for the video file;
determine or access a second timestamp for a previously received video file;
determine, based on the first timestamp and the second timestamp, whether the video file was recorded after the previously received video file;
in response to determining the video file was not recorded after the previously received video file, generate the automation script, based at least in part on a previously generated automation script for the previously received video file; and
in response to determining the video file was recorded after the previously received video file, update the previously generated automation script for the previously received video file, based on the automation script.

8. A method, the method comprising:
receiving, by a processor, a video file comprising a first frame and a second frame;
determining, by the processor, a first object in the first frame and a first user action performed in the first frame;
determining, by the processor, a second object in the second frame and a second user action performed in the second frame;
determining, by the processor, based on the first object and the first user action, a first keyword for the first user action;
determining, by the processor, based on the second object and the second user action, a second keyword for the second user action;
determining, by the processor, based on the first keyword, a first script from an environment file;

determining, by the processor, based on the second keyword, a second script from the environment file;

combining, by the processor, the first script and the second script, to generate an automation script that, when executed, performs the first user action on the first object and the second user action on the second object;

determining, by the processor, a third object in a third frame of the video file;

comparing, by the processor, a type of the third object to a list of known object types stored in the memory to determine a similarity score between the third object and a known object from the list;

in response to determining a similarity score that is greater than a predefined similarity threshold, assigning, by the processor, the known object type to the third object; and in response to determining a similarity score that is less than the predefined similarity threshold, generating, by the processor, a new object type for the third object.

9. The method of claim 8, further comprising:
determining, by the processor, a position of the first object; and
updating, by the processor, based on the position of the first object, the first keyword for the first user action.

10. The method of claim 8, wherein determining the first object and the first user action comprises applying a deep convolutional neural network to the first frame.

11. The method of claim 8, wherein determining the first keyword and the second keyword comprises accessing a database comprising a record of previously determined objects and user actions.

12. The method of claim 8, further comprising updating, by the processor, the environment file, based on the generated automation script.

13. The method of claim 8, further comprising:
determining or accessing, by the processor, a first timestamp for the video file;
determining or accessing, by the processor, a second timestamp for a previously received video file;
determining, by the processor, based on the first timestamp and the second timestamp, whether the video file was recorded after the previously received video file;
in response to determining the video file was not recorded after the previously received video file, generating, by the processor, the automation script, based at least in part on a previously generated automation script for the previously received video file; and
in response to determining the video file was recorded after the previously received video file, updating, by the processor, the previously generated automation script for the previously received video file, based on the automation script.

14. A system comprising:
a database comprising an environment file; and
an automation tool configured to:
receive a video file comprising a first frame and a second frame;
determine a first object in the first frame and a first user action performed in the first frame;
determine a second object in the second frame and a second user action performed in the second frame;
determine, based on the first object and the first user action, a first keyword for the first user action;
determine, based on the second object and the second user action, a second keyword for the second user action;
determine, based on the first keyword, a first script from the environment file of the database;
determine, based on the second keyword, a second script from the environment file of the database;
combine the first script and the second script to generate an automation script that, when executed, performs the first user action on the first object and the second user action on the second object;
determine a third object in a third frame of the video file;
compare a type of the third object to a list of known object types stored in the memory to determine a similarity score between the third object and a known object from the list;
in response to determining a similarity score that is greater than a predefined similarity threshold, assign the known object type to the third object; and
in response to determining a similarity score that is less than the predefined similarity threshold, generate a new object type for the third object.

15. The system of claim 14, wherein the automation tool is further configured to:
determine a position of the first object; and
update, based on the position of the first object, the first keyword for the first user action.

16. The system of claim 14, wherein the automation tool is further configured to:
determine or access a first timestamp for the video file;
determine or access a second timestamp for a previously received video file;
determine, based on the first timestamp and the second timestamp, whether the video file was recorded after the previously received video file;
in response to determining the video file was not recorded after the previously received video file, generate the automation script, based at least in part on a previously generated automation script for the previously received video file; and
in response to determining the video file was recorded after the previously received video file, update the previously generated automation script for the previously received video file, based on the automation script.

17. The system of claim 14, wherein the automation tool is further configured to determine the first keyword and the second keyword based at least in part on a record of previously determined objects and user actions.

18. The system of claim 14, wherein the automation tool is further configured to update the environment file in the database, based on the automation script.

* * * * *